US009813947B2

(12) United States Patent
Qiang et al.

(10) Patent No.: US 9,813,947 B2
(45) Date of Patent: Nov. 7, 2017

(54) CLEARANCE OF FREQUENCY SPECTRUM IN A CELL USING AUTHORIZED SHARED ACCESS (ASA)

(75) Inventors: Jian Feng Qiang, Beijing (CN); Simone Redana, Munich (DE); Vinh Van Phan, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 147 days.

(21) Appl. No.: 14/410,267

(22) PCT Filed: Jun. 29, 2012

(86) PCT No.: PCT/EP2012/062751
§ 371 (c)(1),
(2), (4) Date: Aug. 17, 2015

(87) PCT Pub. No.: WO2014/000818
PCT Pub. Date: Jan. 3, 2014

(65) Prior Publication Data
US 2015/0350960 A1    Dec. 3, 2015

(51) Int. Cl.
*H04M 1/66* (2006.01)
*H04W 36/00* (2009.01)
(Continued)

(52) U.S. Cl.
CPC ....... *H04W 36/0016* (2013.01); *H04W 12/08* (2013.01); *H04W 16/06* (2013.01);
(Continued)

(58) Field of Classification Search
CPC ..... H04W 12/08; H04W 16/06; H04W 16/14; H04W 36/0016; H04W 36/08; H04W 36/22
(Continued)

(56) References Cited

U.S. PATENT DOCUMENTS

| 2011/0111753 A1 | 5/2011 | Vainikka et al. ............. 455/425 |
| 2011/0128862 A1* | 6/2011 | Kallin .................... H04W 36/22 370/245 |

(Continued)

OTHER PUBLICATIONS

Hugl, Klaus, "Meeting the Challenges for Future Wireless Communication Needs", © Nokia 2012, May 8, 2012, 18 pgs.
(Continued)

*Primary Examiner* — Timothy Pham
(74) *Attorney, Agent, or Firm* — Harrington & Smith

(57) ABSTRACT

The invention relates to the Authorized Shared Access (ASA) concept in which a source node temporarily uses ASA spectrum as secondary user and on request of an ASA controller said ASA spectrum needs to be cleared (evacuated) and made available to a primary spectrum user and thus target nodes have to be selected by the source node to take over traffic from the source node; the source node thus obtains resource information of at least one target node for the spectrum clearance, choose at least one target node for clearance traffic transfers based on the resource information of the at least one target node, inform the chosen at least one target node about the coming traffic transfers, and transfer traffic by using a handover procedure; the target node reserves resources after receiving the information about the coming traffic transfers.

15 Claims, 3 Drawing Sheets

Figure 1:
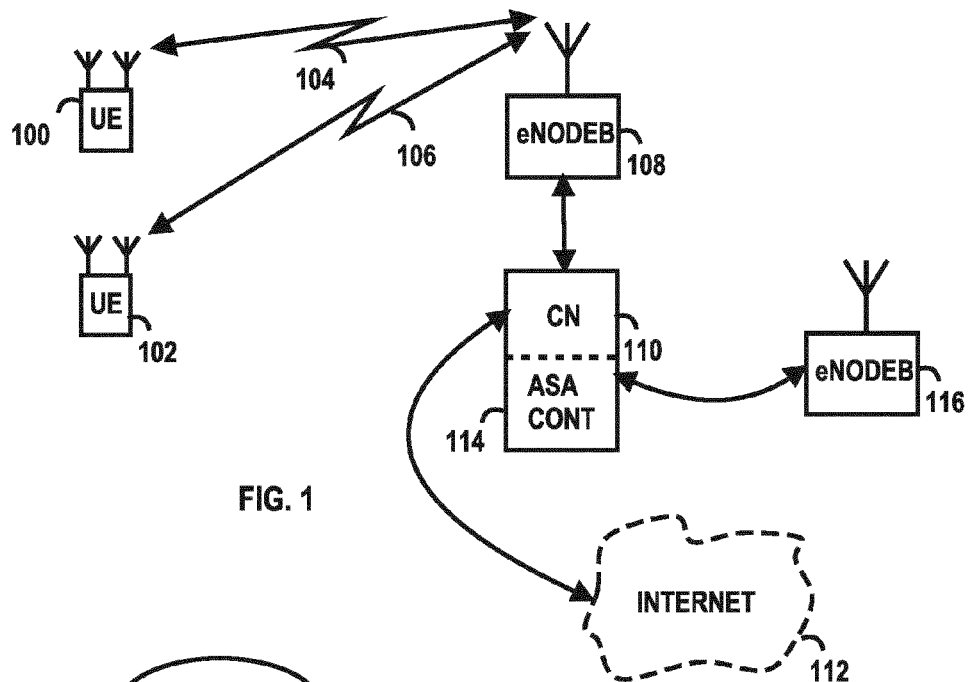

(51) Int. Cl.
*H04W 12/08* (2009.01)
*H04W 16/06* (2009.01)
*H04W 16/14* (2009.01)
*H04W 36/22* (2009.01)
*H04W 36/08* (2009.01)

(52) U.S. Cl.
CPC ........... *H04W 16/14* (2013.01); *H04W 36/22* (2013.01); *H04W 36/08* (2013.01)

(58) Field of Classification Search
USPC .......................................................... 455/411
See application file for complete search history.

(56) References Cited

U.S. PATENT DOCUMENTS

| | | | |
|---|---|---|---|
| 2011/0274083 A1 | 11/2011 | Bazzo et al. | 370/331 |
| 2012/0195238 A1* | 8/2012 | Li | H04W 36/0016 370/280 |
| 2013/0210422 A1* | 8/2013 | Pani | H04W 8/02 455/423 |

OTHER PUBLICATIONS

"Report on ASA concept", European Conference of Postal and Telecommunications Administrations, Apr. 2012, 10 pgs.

Shellhammer, Steve, "ASA (Authorized Shared Access)—A Novel Spectrum Policy Vision", Qualcomm, The Wireless Innovation Forum—White Space communications Summit, 2011, 12 pgs.

"Study of the ASA concept", CEPT ECC CG CRS (11) meeting proposal, Sep. 26, 2011, 9 pgs.

3GPP TS 36.211 V10.5.0 (Jun. 2012), "3$^{rd}$ Generation Partnership Project; Technical Specification Group Radio Access Network; Evolved Universal Terrestrial Radio Access (E-UTRA); Physical Channels and Modulation (Release 10)", 101 pgs.

3GPP TS 36.331 V10.5.0 (Mar. 2012), "3$^{rd}$ Generation Partnership Project; Technical Specification Group Radio Access Network; Evolved Universal Terrestrial Radio Access (E-UTRA); Radio Resource Control (RRC); Protocol specification (Release 10)", 302 pgs.

3GPP TS 36.423 V11.0.0 (Mar. 2012), "3$^{rd}$ Generation Partnership Project; Technical Specification Group Radio Access Network; Evolved Universal Terrestrial Radio Access Network (E-UTRAN); X2 application protocol (X2AP) (Release 11)", 134 pgs.

* cited by examiner

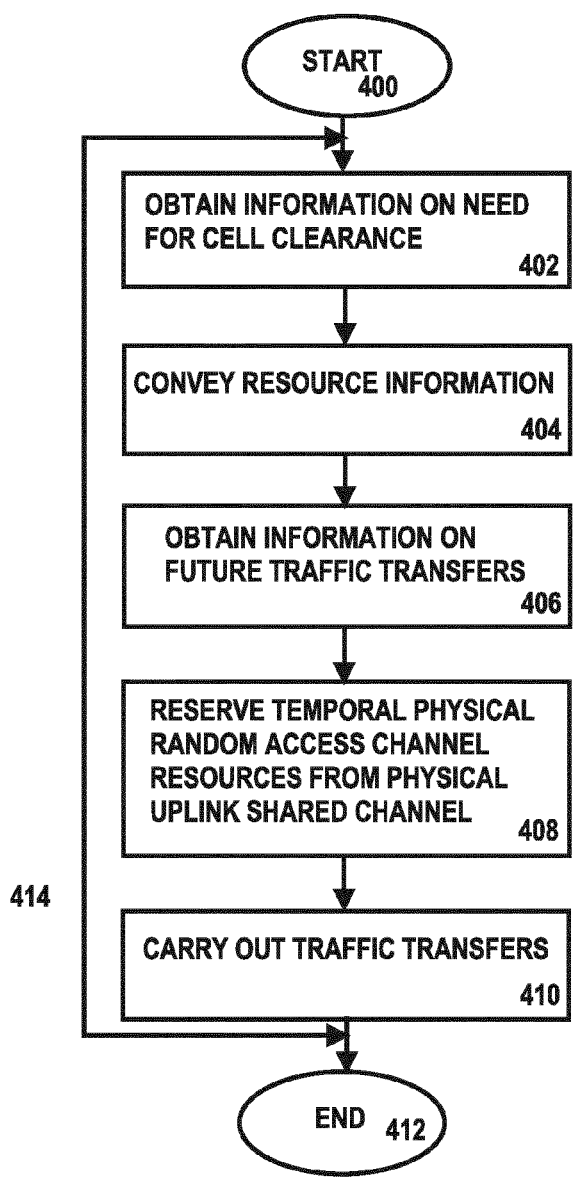
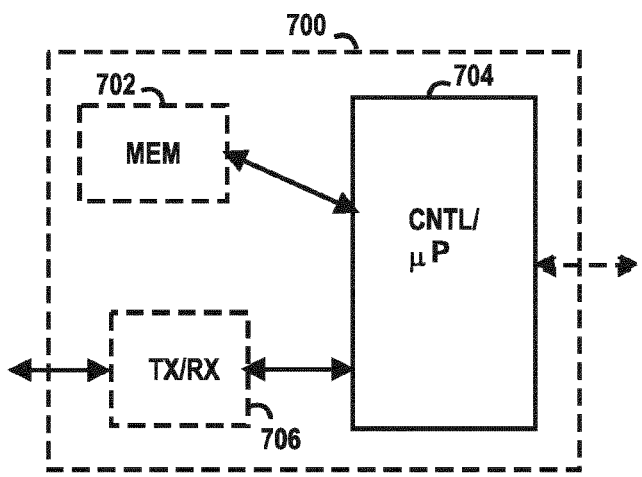
FIG. 4
FIG. 7

CLEARANCE OF FREQUENCY SPECTRUM IN A CELL USING AUTHORIZED SHARED ACCESS (ASA)

FIELD

The invention relates to apparatuses, methods, systems, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In the LTE-Advanced, the concept of authorized shared access (ASA) has been under consideration. The ASA allows new users to access already licensed spectrum with the obligation to protect the incumbent (primary) user. The access may be carried out by using cognitive radio capabilities, such as geolocation databases complemented, if required, by sensing.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: obtain resource information of at least one target node for a cell clearance, choose at least one target node for cell clearance traffic transfers based on the resource information of the at least one target node, inform the chosen at least one target node about coming traffic transfers, and transfer traffic by using a handover procedure.

According to an aspect of the present invention, there is provided an apparatus comprising: at least one processor and at least one memory including a computer program code, the at least one memory and the computer program code configured to, with the at least one processor, cause the apparatus at least to: inform a need for cell clearance from secondary users.

According to an aspect of the present invention, there is provided an apparatus comprising: at least one processor and at least one memory including a computer program code, the at least one memory and the computer program code configured to, with the at least one processor, cause the apparatus at least to: obtain information on a need for a cell clearance of at least one neighbour cell, convey resource information to the at least one neighbour cell, obtain information on future traffic transfers for the cell clearance, reserve temporal physical random access channel resources from a physical uplink shared channel, and carry out handover procedures for the traffic transfers.

According to yet another aspect of the present invention, there is provided a method comprising: obtaining resource information of at least one target node for a cell clearance, choosing at least one target node for cell clearance traffic transfers based on the resource information of the at least one target node, informing the chosen at least one target node about coming traffic transfers, and transferring traffic by using a handover procedure.

According to yet another aspect of the present invention, there is provided a method comprising: informing a need for cell clearance from secondary users.

According to yet another aspect of the present invention, there is provided a method comprising: obtaining information on a need for a cell clearance of at least one neighbour cell, conveying resource information to the at least one neighbour cell, obtaining information on future traffic transfers for the cell clearance, reserving temporal physical random access channel resources from a physical uplink shared channel, and carrying out handover procedures for the traffic transfers.

According to yet another aspect of the present invention, there is provided an apparatus comprising: means for obtaining resource information of at least one target node for a cell clearance, means for choosing at least one target node for cell clearance traffic transfers based on the resource information of the at least one target node, means for informing the chosen at least one target node about coming traffic transfers, and means for transferring traffic by using a handover procedure.

According to yet another aspect of the present invention, there is provided an apparatus comprising: means for informing a need for cell clearance from secondary users.

According to yet another aspect of the present invention, there is provided an apparatus comprising: means for obtaining information on a need for a cell clearance of at least one neighbour cell, means for conveying resource information to the at least one neighbour cell, means for obtaining information on future traffic transfers for the cell clearance, means for reserving temporal physical random access channel resources from a physical uplink shared channel, and means for carrying out handover procedures for the traffic transfers.

According to yet another aspect of the present invention, there is provided a computer program embodied on a computer-readable storage medium, the computer program comprising program code for controlling a process to execute a process, the process comprising: obtaining resource information of at least one target node for a cell clearance, choosing at least one target node for cell clearance traffic transfers based on the resource information of the at least one target node, informing the chosen at least one target node about coming traffic transfers, and transferring traffic by using a handover procedure.

According to yet another aspect of the present invention, there is provided a computer program embodied on a computer-readable storage medium, the computer program comprising program code for controlling a process to execute a process, the process comprising: informing a need for cell clearance from secondary users.

According to yet another aspect of the present invention, there is provided a computer program embodied on a computer-readable storage medium, the computer program comprising program code for controlling a process to execute a process, the process comprising: obtaining information on a need for a cell clearance of at least one neighbour cell, conveying resource information to the at least one neighbour cell, obtaining information on future traffic transfers for the cell clearance, reserving temporal physical random access channel resources from a physical uplink shared channel, an carrying out handover procedures for the traffic transfers.

LIST OF DRAWINGS

Figure 3:
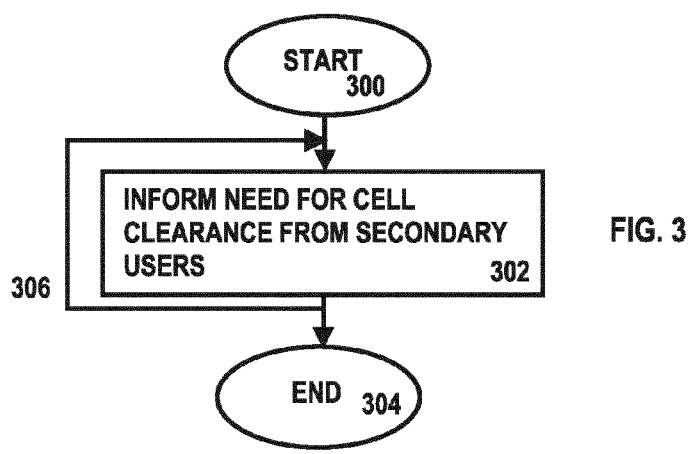
Figure 5:
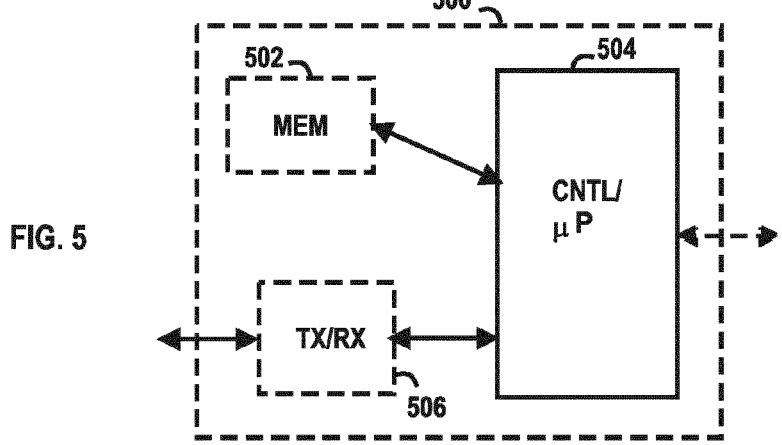
Figure 2:
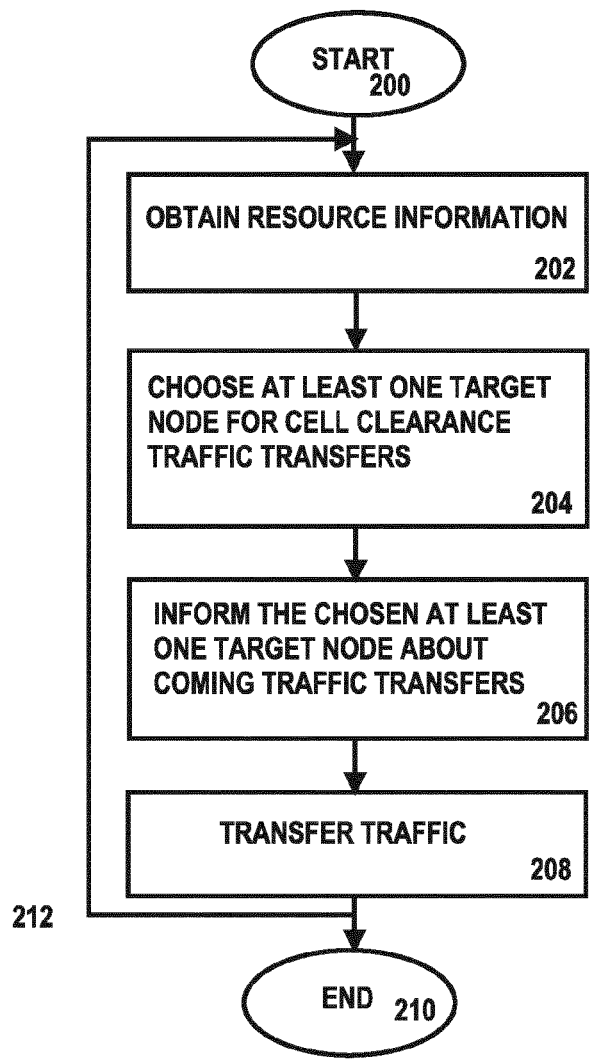
Figure 6:
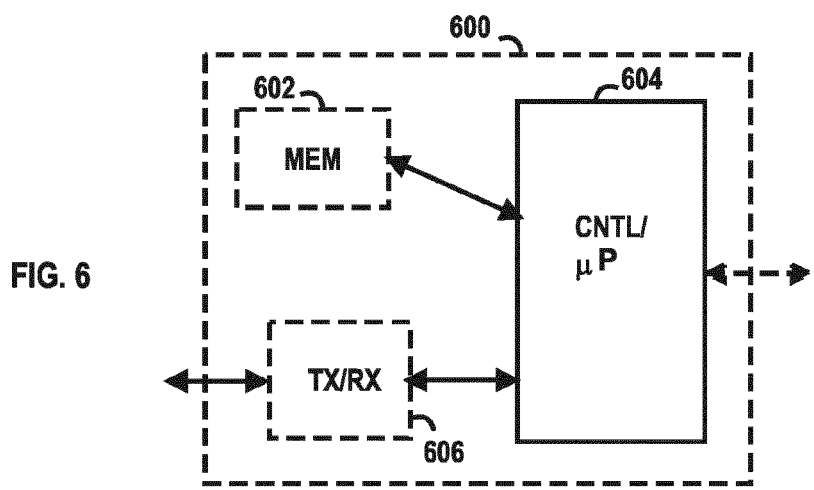

Some embodiments of the present invention are described below, by way of example only, with reference to the accompanying drawings, in which FIG. 1 illustrates an example of a system;
FIG. 2 is a flow chart;
FIG. 3 is another flow chart;
FIG. 4 is yet another flow chart;
FIG. 5 illustrates examples of apparatuses;
FIG. 6 illustrates other examples of apparatuses, and
FIG. 7 illustrates yet other examples of apparatuses.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS).

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease InterSymbol Interference. Unlike in OFDM, SC-FDMA subcarriers are not independently modulated.

Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule transmissions to user devices. Such required information is usually signalled to the (e)NodeB.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1 shows a part of a radio access network based on E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104 and 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeBs of FIG. 1 may provide any kind of these cells. A cellular radio system may be implemented as a multilayer network including several kinds of cells. Typically, in multilayer networks, one node B provides one kind of a cell or cells, and thus a plurality of (e) Node Bs are required to provide such a network structure.

Recently for fulfilling the need for improving the deployment and performance of communication systems, the concept of "plug-and-play" (e)NodeBs has been introduced. Typically, a network which is able to use "plug-and-play" (e)Node Bs, includes, in addition to Home (e)NodeBs (H(e) nodeBs), a home node B gateway, or HNB-GW (not shown in FIG. 1). A HNB Gateway (HNB-GW), which is typically installed within an operator's network may aggregate traffic from a large number of HNBs back to a core network.

In the LTE-Advanced, the concept of authorized shared access (ASA) has been under consideration. The ASA allows new users to access already licensed spectrum with the obligation to protect the incumbent (primary) user. For example, the ASA allows international mobile telecommunications (IMT) service to access the bands that are underutilised by existing primary uses, especially to bands that have been allocated to mobile but not made available for mobile use through current regulatory means. The access may be carried out by using cognitive radio capabilities, such as geolocation databases complemented, if required, by sensing. In general, the ASA is neither similar to exclusive licensing nor license-exempt but has few commonalities with licensing-light. According to the ASA concept, a secondary usage is possible, but the operator needs to evacuate its ASA spectrum for providing service to primary ASA users, if required. In principle, for the cell evacuation or clearance, fast and robust handovers to neighbouring cells are required. Thus, an abrupt need for the addition of random access channel (RACH) resources may take place. Additionally, an effective and fast load-balancing procedure may be required.

It should be appreciated that embodiments described herein may be applied, in addition to the ASA, to cell evacuation or clearance in general, such as on-the-fly cell switching-off for energy-saving or performance optimization, site-failure recovery, etc. Embodiments are also suitable for intra/inter radio access technology (RAT) handovers. In this application, term "cell clearance" is used in a broad meaning including all situations when a cell is going to be emptied (such as for a switch-off or from a selected kind of traffic or selected users).

One embodiment may be carried out by a device configured to operate as a network apparatus, such as a server, (e)node or host. The embodiment may also be provided as a cloud service. The embodiment is related to authorised shared access (ASA) concept using cognitive radio technology. The embodiment is suitable to be carried out by an apparatus operating as a node for a cell to be evacuated (source node). Evacuation or clearance means that all traffic is transferred to one or more other cells. The embodiment starts in block 200 of FIG. 2.

In block 202, resource information of at least one target node is obtained for a cell clearance.

A cell clearance may be triggered by either an ASA controller or by a source node (eNB) of the ASA cell in question. An ASA controller may locate in a core network, it may be a stand-alone device or it may be provided as a cloud service. Typically, the ASA controller is a part of an operator management network. All potential neighbour cells may be informed about the coming cell clearance. A target node may, upon receiving the evacuation or clearance notification, determine "quota" specifying resources it can allocate for evacuation or clearance traffic and indicate that to the source node over an interface between the source node and the target node, such as an X2 interface. The "quota" may include the maximum number of user devices it is able to provide service for, maximum total or aggregated guaranteed bit rate and/or a timing parameter ("quota" life-time) specifying the period of time the "quota" is valid. This timing parameter may be indicated as a time stamp, system frame number or sub-frame the message is sent over an interface between the source node and the target node, such as X2, or duration. As an option, a common preconfigured cell evacuation or clearance timer at involved nodes (eNBs) may also be provided. The "quota" is informed to the source node (eNB).

As put forward above, in an embodiment, a source node may obtain an evacuation or clearance command or message from an ASA controller after which the source node may inform target nodes about the large number of coming handovers. For this purpose, a handover request message may be enhanced to also include a request for a plurality or group of user devices intended to be handed over to the target node. Upon receiving the evacuation or clearance command from the ASA controller, the source node using ASA spectrum may trigger the evacuation or clearance procedure and ban the user devices to select/reselect the cell to be evacuated.

Yet another option is that upon receiving an evacuation or clearance command or message from an ASA controller, a source node informs all neighbour cells before the preparation of a handover request for the coming cell evacuation or clearance. This evacuation clearance command or message may be transmitted from operation and maintenance to nodes using ASA spectrum.

In the example of FIG. 1, ASA controller 114 is located in a core network 110 which is shared by ASA network (which in this example is illustrated by node 116) and another network (illustrated in this example by the node 108). Different networks may also have core networks of their own. The ASA controller may also be a stand-alone device or implemented as a cloud service. The node 116 is a so-called incumbent node (primary node or node belonging to an incumbent operator).

In block 204, at least one target node is chosen for cell clearance traffic transfers based on the resource information of the at least one target node.

In one embodiment, a source node may determine and select one or more target nodes based on "quotas" received from these nodes. A source node may also group user devices according to available resources in the target nodes for group-based handovers to achieve an improved speed of the evacuation or clearance process. Typically, the sizes of the groups vary according to the available resources. In the case the "quota" is not needed anymore, the source node may transmit an indication the target node to release the "quota". A corresponding indication may also be transmitted to neighbour nodes which were not selected as cell evacuation or clearance target nodes.

In block 206, the chosen at least one target node is informed about coming traffic transfers.

A node using ASA spectrum (cell evacuation or clearance source node) may keep neighbour nodes up-to-date about the load (the total number of traffic transfers) in the ASA cell (by using an ASA cell load indicator, for example) and/or how many users need to be handed over to each of them for they being able to reserve temporal physical random access resources from a physical uplink shared channel (PUSCH).

An X2 resource status update message may be enhanced to inform neighbour nodes on their shares of the load in the cell to be evacuated. The X2 resource status update message may be used to estimate the temporal PRACH resources each target node has to reserve.

The indication may be transmitted to an individual target node or a plurality of target nodes.

In block 208, traffic is transferred by using a handover procedure.

A normal handover procedure may be applied and the users may be transferred one by one or on a group-basis. A source node may transmit a handover command to user devices involved. An X2 handover request message may be enhanced in such a manner that it includes information for multiple user devices to be handed over to a same target node, thus one handover request message is enough instead of one for every user device to be transferred.

Upon completing the handovers, a source node may inform target nodes for the evacuation or clearance being completed in order they may release temporal RACH resources. An X2 configuration update message may be enhanced for this purpose.

In an embodiment, all neighbour cells or at least target nodes are informed that the cell is switched off because of ASA cell evacuation and not for energy saving. From this nodes read that they should not ask for reactivation. Neighbour cell relation update information may be conveyed by using a suitable node-to-node interface. An X2 configuration update message may be enhanced for this purpose.

In one embodiment, two values may be included for the prach-ConfigIndex in a same MobilityControlInfo message, one temporal value for handover burst (temporal PRACH configuration target cell) which values expire after the ASA cell evacuation is over or the handover burst is over. The second value is for normal configuration, thus user devices handed over to a target cell do not need to decode SIB2 (SIB=system information block) in the target cell to obtain "normal" PRACH configuration.

As to finish a cell evacuation or clearance, a source node may send an evacuation report and/or acknowledgement to an ASA controller, reporting the numbers of successful and/or failure handovers, abnormal events in evacuation, etc.

The embodiment ends in block 210. The embodiment is repeatable in many ways. One example is shown by arrow 212 in FIG. 2.

Another embodiment may be carried out by a device configured to operate as a network apparatus, such as a server, (e)node or host. The embodiment may also be provided as a cloud service. The embodiment is related to the authorised shared access (ASA) concept using cognitive radio technology. The embodiment is suitable to be carried out by an apparatus operating as an ASA controller. In the example of FIG. 1, ASA controller 114 is located in a core network 110 which is shared by ASA network (which in this example is illustrated by node 116) and another network (illustrated in this example by the node 108). Different networks may also have core networks of their own. The ASA controller may also be a stand-alone device or implemented as a cloud service. The node 116 is a so-called incumbent node.

The embodiment starts in block 300 of FIG. 3.

In block 302, a need for cell clearance from secondary users is informed.

A cell evacuation or clearance may be triggered by an ASA controller. An ASA controller may locate in a core network, it may be a stand-alone device or it may be provided as a cloud service. Typically, the ASA controller is a part of an operator management network. All potential neighbour cells may be informed about the coming cell evacuation or clearance. The information may be carried out by using other resources than those to be emptied for ASA services.

An ASA controller, when sending an ASA cell evacuation or clearance command or message to nodes using the ASA spectrum, may also inform neighbour nodes not using the ASA spectrum that the ASA spectrum needs to be evacuated.

In one embodiment, an ASA controller also informs the neighbours or target cells that the cell is switched off because of ASA cell evacuation or clearance and not for energy saving. From this nodes read that they should not ask for reactivation. Neighbour cell relation update information may be conveyed by using a suitable node-to-node interface. An X2 configuration update message may be enhanced for this purpose.

The embodiment ends in block 304. The embodiment is repeatable in many ways. One example is shown by arrow 306 in FIG. 3.

Yet another embodiment may be carried out by a device configured to operate as a network apparatus, such as a server, (e)node or host. The embodiment may also be provided as a cloud service. The embodiment is related to an authorised shared access (ASA) concept using cognitive radio technology. The embodiment is suitable to be carried out by an apparatus operating as a node for a cell receiving cell evacuation or clearance traffic (target node). Evacuation or clearance means that all traffic is transferred to one or more other cells. The embodiment starts in block 400 of FIG. 4.

In block 402, information on a need for cell clearance of at least one neighbour cell is obtained.

A cell evacuation or clearance may be triggered by either an ASA controller or by a source eNB of the ASA cell in question. An ASA controller may locate in a core network, it may be a stand-alone device or it may be provided as a cloud service. Typically, the ASA controller is a part of an operator management network. The information may be in a form of an evacuation or clearance notification.

In the example of FIG. 1, ASA controller 114 is located in a core network 110 which is shared by ASA network (which in this example is illustrated by node 116) and another network (illustrated in this example by the node 108). Different networks may also have core networks of their own. The ASA controller may also be a stand-alone device or implemented as a cloud service. The node 116 is a so-called incumbent node.

In block 404, resource information is conveyed to the at least one neighbour cell.

A target node may, upon receiving the evacuation or clearance notification, determine "quota" specifying resources it can allocate for evacuation or clearance traffic and indicate that to the source node over an interface between the source node and the target node, such as the X2 interface. The "quota" may include the maximum number of user devices it is able to provide service for, maximum total or aggregated guaranteed bit rate and/or a timing parameter ("quota" life-time) specifying the period of time the "quota" is valid. This timing parameter may be indicated as a time stamp, system frame number or sub-frame the message is sent over an interface between the source node and the target node, such as X2, or duration. As an option, a common preconfigured cell evacuation or clearance timer at involved nodes may also be provided. The "quota" may be transmitted to a source node.

It should be appreciated that, typically, a "quota" is not a capacity indication or resource status update used in regular load-balancing acts. This "quota" is primarily designed for urgent needs of the cell evacuation or switching off. However, the "quota" and related functionality may be applied to enhancing a group handover or load balancing operations with less urgency or strict networking enforcement as well.

In block 406, information on future traffic transfers for the cell clearance is obtained.

A node using ASA spectrum (cell evacuation or clearance source node) may keep neighbour nodes (potential target nodes) up-to-date about the load in the ASA cell (by using an ASA cell load indicator, for example) and/or how many users need to be handed over to each of them for them being able to reserve temporal physical random access resources from a physical uplink shared channel (PUSCH). An X2 resource status update message may be enhanced to inform neighbour nodes on their shares of the load in the cell to be evacuated.

In block 408, temporal physical random access channel resources are reserved from a physical uplink shared channel.

An X2 resource status update message may be used to inform the amount of temporal PRACH resources a target node has to reserve.

During the handover burst for an ASA cell evacuation or clearance, a target node may take temporal PRACH resources from PUSCH to improve RACH capacity. Before and after the ASA cell evacuation or clearance procedure, the target node may use these resources for the PUSCH.

It should be appreciated that exact procedures of using RACH resources may vary in different radio interface standards but the principle is still applicable when modified according to needs.

A target node may transmit an X2 handover request acknowledgement message to a source cell to inform reserved temporal PRACH resources and PRACH configuration.

In block 410, handover procedures are carried out for the traffic transfers.

A normal handover procedure may be applied and the users may be transferred one by one or on a group-basis. A source node may carry out the grouping.

Upon completing the handovers, a source node may inform target cells for the evacuation or clearance being completed in order they may release temporal RACH resources. An X2 configuration update message may be enhanced for this purpose.

A target node may inform a source node and/or an ASA controller about successful and/or failure handovers.

The embodiment ends in block 412. The embodiment is repeatable in many ways. One example is shown by arrow 414 in FIG. 4.

The steps/points, signaling messages and related functions described above in FIGS. 2, 3 and 4 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

It should be understood that conveying, broadcasting, signalling transmitting and/or receiving may herein mean preparing a data conveyance, broadcast, transmission and/or reception, preparing a message to be conveyed, broadcasted, signalled, transmitted and/or received, or physical transmission and/or reception itself, etc. on a case by case basis. The same principle may be applied to terms transmission and reception as well.

An embodiment provides an apparatus which may be any node, host, server, web stick or any other suitable apparatus capable to carry out processes described above in relation to FIG. 2.

It should be appreciated that an apparatus may include or otherwise be in communication with a control unit, one or more processors or other entities capable of carrying out operations according to the embodiments described by means of FIG. 2. It should be understood that each block of the flowchart of FIG. 2 and any combination thereof may be implemented by various means or their combinations, such as hardware, software, firmware, one or more processors and/or circuitry.

FIG. 5 illustrates a simplified block diagram of an apparatus according to an embodiment.

As an example of an apparatus according to an embodiment, it is shown apparatus 500, such as a node, including facilities in control unit 504 (including one or more processors, for example) to carry out functions of embodiments according to FIG. 2. The facilities may be software, hardware or combinations thereof as described in further detail below.

In FIG. 5, block 506 includes parts/units/modules needed for reception and transmission, usually called a radio front end, RF-parts, radio parts, radio head, etc.

Another example of apparatus 500 may include at least one processor 504 and at least one memory 502 including a computer program code, the at least one memory and the computer program code configured to, with the at least one processor, cause the apparatus at least to: obtain resource information of at least one target node for a cell clearance, choose at least one target node for cell clearance traffic transfers based on the resource information of the at least one target node, inform the chosen at least one target node about coming traffic transfers, and transfer traffic by using a handover procedure.

Yet another example of an apparatus comprises means 504 (506) for obtaining resource information of at least one target node for a cell clearance, means 504 for choosing at least one target node for cell clearance traffic transfers based on the resource information of the at least one target node, means 504 (506) for informing the chosen at least one target node about coming traffic transfers, and means 504 (506) for transferring traffic by using a handover procedure.

Yet another example of an apparatus comprises an obtainer configured to obtain resource information of at least one target node for a cell clearance, a chooser configured to choose at least one target node for cell clearance traffic transfers based on the resource information of the at least one target node, an informing unit configured to inform the chosen at least one target node about coming traffic transfers, and a transferring unit configured to transfer traffic by using a handover procedure.

It should be understood that the apparatuses may include or be coupled to other units or modules etc., such as radio parts or radio heads, used in or for transmission and/or reception. This is depicted in FIG. 5 as optional block 506.

Although the apparatuses have been depicted as one entity in FIG. 5, different modules and memory may be implemented in one or more physical or logical entities.

An embodiment provides an apparatus which may be an ASA controller or other suitable apparatus capable to carry out processes described above in relation to FIG. 3.

It should be appreciated that an apparatus may include or otherwise be in communication with a control unit, one or more processors or other entities capable of carrying out operations according to the embodiments described by means of FIG. 3. It should be understood that each block of the flowchart of FIG. 3 and any combination thereof may be implemented by various means or their combinations, such as hardware, software, firmware, one or more processors and/or circuitry.

FIG. 6 illustrates a simplified block diagram of an apparatus according to an embodiment.

As an example of an apparatus according to an embodiment, it is shown apparatus 600, such as an ASA controller, including facilities in control unit 604 (including one or more processors, for example) to carry out functions of embodiments according to FIG. 3. The facilities may be software, hardware or combinations thereof as described in further detail below.

In FIG. 6, block 606 includes parts/units/modules needed for reception and transmission, usually called a radio front end, RF-parts, radio parts, radio head, etc.

Another example of apparatus 600 may include at least one processor 604 and at least one memory 602 including a computer program code, the at least one memory and the computer program code configured to, with the at least one processor, cause the apparatus at least to: inform a need for cell clearance from secondary users.

Yet another example of an apparatus comprises means 604 (606) for informing a need for cell clearance from secondary users.

Yet another example of an apparatus comprises an informing unit configured to inform a need for cell clearance from secondary users.

It should be understood that the apparatuses may include or be coupled to other units or modules etc., such as radio parts or radio heads, used in or for transmission and/or reception. This is depicted in FIG. 6 as optional block 606.

Although the apparatuses have been depicted as one entity in FIG. 6, different modules and memory may be implemented in one or more physical or logical entities.

An embodiment provides an apparatus which may be any node, server, host or other suitable apparatus capable to carry out processes described above in relation to FIG. 4.

It should be appreciated that an apparatus may include or otherwise be in communication with a control unit, one or more processors or other entities capable of carrying out operations according to the embodiments described by means of FIG. 4. It should be understood that each block of the flowchart of FIG. 4 and any combination thereof may be implemented by various means or their combinations, such as hardware, software, firmware, one or more processors and/or circuitry.

FIG. 7 illustrates a simplified block diagram of an apparatus according to an embodiment.

As an example of an apparatus according to an embodiment, it is shown apparatus 700, such as a node, including facilities in control unit 704 (including one or more processors, for example) to carry out functions of embodiments according to FIG. 4. The facilities may be software, hardware or combinations thereof as described in further detail below.

In FIG. 7, block 706 includes parts/units/modules needed for reception and transmission, usually called a radio front end, RF-parts, radio parts, radio head, etc.

Another example of apparatus 700 may include at least one processor 704 and at least one memory 702 including a computer program code, the at least one memory and the computer program code configured to, with the at least one processor, cause the apparatus at least to: obtain information on a need for a cell clearance of at least one neighbour cell, convey resource information to the at least one neighbour cell, obtain information on future traffic transfers for the cell clearance, reserve temporal physical random access channel resources from a physical uplink shared channel, and carry out handover procedures for the traffic transfers.

Yet another example of an apparatus comprises means 704 (706) for obtaining information on a need for a cell clearance of at least one neighbour cell, means for conveying resource information to the at least one neighbour cell, means for obtaining information on future traffic transfers for the cell clearance, means for reserving temporal physical random access channel resources from a physical uplink shared channel, and means for carrying out handover procedures for the traffic transfers.

Yet another example of an apparatus comprises a first obtainer configured to obtain information on a need for a cell clearance of at least one neighbour cell, a conveying unit configure d to convey resource information to the at least one neighbour cell; a second obtainer configured to obtain information on future traffic transfers for the cell clearance, a reserver configured to reserve temporal physical random access channel resources from a physical uplink shared channel, and a handover unit configured to carry out handover procedures for the traffic transfers.

It should be understood that the apparatuses may include or be coupled to other units or modules etc., such as radio parts or radio heads, used in or for transmission and/or reception. This is depicted in FIG. 7 as optional block 706.

Although the apparatuses have been depicted as one entity in FIG. 7, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:
1. An apparatus comprising:
at least one processor and at least one memory including a computer program code, the at least one memory and the computer program code configured to, with the at least one processor, cause the apparatus at least to:
obtain, at a target node, information indicating a cell clearance is to be carried out for secondary users under authorized shared access concept of at least one neighbor cell;
convey information to the at least one neighbor cell on resources allocable to traffic in relation to the cell clearance, wherein the information on resources comprises maximum number of user devices the target node is able to provide service for, maximum total or aggregated guaranteed bit rate for the traffic in relation to the cell clearance, and/or timing parameter specifying a period of time the resource information is valid;

obtain information on traffic transfers to be handed over from the at least one neighbor node to the target node for the cell clearance;

reserve, by the target node, temporal physical random access channel resources from a physical uplink shared channel for the traffic transfers, and carry out handover procedures to the target node for the traffic transfers.

2. The apparatus of claim 1, wherein the timing parameter is indicated as a time stamp, system frame number or sub-frame message sent over an interface between the at least one neighbor cell and the target node, or a duration of a period of time the information on resources is valid.

3. The apparatus of claim 1, wherein an X2 resource status update message is used to inform the amount of temporal physical random access channel resources to be reserved.

4. The apparatus of claim 1, wherein the at least one memory and the computer program code are further configured, with the at least one processor, to further cause the apparatus to:

release the temporal physical random access channel resources after the traffic transfers have been completed for the cell clearance.

5. The apparatus of claim 1, wherein the at least one memory and the computer program code are further configured, with the at least one processor, to further cause the apparatus to:

inform reserved temporal physical random access channel resources and configuration to the at least one neighbor cell to be evacuated.

6. A method comprising:

obtaining, at a target node, information indicating a cell clearance is to be carried out for secondary users under authorized shared access concept of at least one neighbor cell;

conveying information to the at least one neighbor cell on resources allocatable to traffic in relation to the cell clearance, wherein the information on resources comprises maximum number of user devices the target node is able to provide service for, maximum total or aggregated guaranteed bit rate for the traffic in relation to the cell clearance, and/or timing parameter specifying a period of time the resource information is valid;

obtaining information on traffic transfers to be handed over from the at least one neighbor node to the target node for the cell clearance;

reserving, by the target node, temporal physical random access channel resources from a physical uplink shared channel for the traffic transfers, and carrying out handover procedures to the target node for the traffic transfers.

7. The method of claim 6, wherein the timing parameter is indicated as a time stamp, system frame number or sub-frame message sent over an interface between the at least one neighbor cell and the target node, or a duration of a period of time the information on resources is valid.

8. The method of claim 6, wherein an X2 resource status update message is used to inform the amount of temporal physical random access channel resources to be reserved.

9. The method of claim 6, further comprising:

releasing the temporal physical random access channel resources after the traffic transfers have been completed for the cell clearance.

10. The method of claim 6, further comprising:

informing reserved temporal physical random access channel resources and configuration to the at least one neighbor cell to be evacuated.

11. A computer program product embodied on a non-transitory computer-readable medium in which a computer program is stored that, when being executed by a computer, is configured to provide instructions to control or carry out:

obtaining, at a target node, information indicating a cell clearance is to be carried out for secondary users under authorized shared access concept of at least one neighbor cell;

conveying information to the at least one neighbor cell on resources allocatable to traffic in relation to the cell clearance, wherein the information on resources comprises maximum number of user devices the target node is able to provide service for, maximum total or aggregated guaranteed bit rate for the traffic in relation to the cell clearance, and/or timing parameter specifying a period of time the resource information is valid;

obtaining information on traffic transfers to be handed over from the at least one neighbor node to the target node for the cell clearance;

reserving, by the target node, temporal physical random access channel resources from a physical uplink shared channel for the traffic transfers, and carrying out handover procedures to the target node for the traffic transfers.

12. The computer program product of claim 11, wherein the timing parameter is indicated as a time stamp, system frame number or sub-frame message sent over an interface between the at least one neighbor cell and the target node, or a duration of a period of time the information on resources is valid.

13. The computer program product of claim 11, wherein an X2 resource status update message is used to inform the amount of temporal physical random access channel resources to be reserved.

14. The computer program product of claim 11, wherein the computer program code is further configured to provide instructions to control or carry out:

releasing the temporal physical random access channel resources after the traffic transfers have been completed for the cell clearance.

15. The computer program product of claim 11, wherein the computer program code is further configured to provide instructions to control or carry out:

informing reserved temporal physical random access channel resources and configuration to the at least one neighbor cell to be evacuated.

* * * * *

UNITED STATES PATENT AND TRADEMARK OFFICE
CERTIFICATE OF CORRECTION

PATENT NO. : 9,813,947 B2
APPLICATION NO. : 14/410267
DATED : November 7, 2017
INVENTOR(S) : Jian Feng Qiang, Simone Redana and Vinh Van Phan It is certified that error appears in the above-identified patent and that said Letters Patent is hereby corrected as shown below:

In the Claims

In Claim 1:
Column 14, Line 63, "allocable" should be deleted and --allocatable-- should be inserted.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*